US005293105A

United States Patent [19]

West, Jr.

[11] Patent Number: 5,293,105

[45] Date of Patent: Mar. 8, 1994

[54] RAIN SENSOR CAR ELECTRIC WINDOW CLOSURE CONTROL

[76] Inventor: Kenneth O. West, Jr., 3102 O'Henry, Garland, Tex. 75042

[21] Appl. No.: 955,413

[22] Filed: Oct. 2, 1992

[51] Int. Cl.[5] ........................ E05F 15/20; B60R 16/02

[52] U.S. Cl. ............................ 318/483; 318/DIG. 2; 15/250.001

[58] Field of Search ................ 361/178, 190; 318/483, 318/266, 468, DIG. 2; 49/28, 24, 29, 21, 23; 15/250 C, 250.05, 25.17

[56] References Cited

U.S. PATENT DOCUMENTS 4,198,573 4/1980 Reneau ................................ 361/178
4,852,469 8/1989 Chaung ............................... 318/266
4,908,554 3/1990 Chance ............................... 318/483
5,004,961 4/1991 Berner et al. ....................... 318/266
5,006,796 4/1991 Yuhas et al. ......................... 318/53
5,159,247 10/1992 Resch ................................ 318/483

*Primary Examiner*—William M. Shoop, Jr.
*Assistant Examiner*—John W. Cabeca
*Attorney, Agent, or Firm*—Warren H. Kintzinger

[57] ABSTRACT

With an automobile having electric power windows a power drive control circuit includes a solid state on-off power solid state device such as a PNP transistor with a moisture content sensor element interconnecting two electrodes of the solid state device (the emitter and base of the PNP transistor). When the moisture content sensor element becomes moistened as by rain falling thereon its electric through path resistance lessens to thereby achieve bias to conductive state for the PNP transistor through conductive state to activate the window motor drive and close any vehicle windows from the open state.

4 Claims, 2 Drawing Sheets

RAIN SENSOR CAR ELECTRIC WINDOW CLOSURE CONTROL

Figure 1:
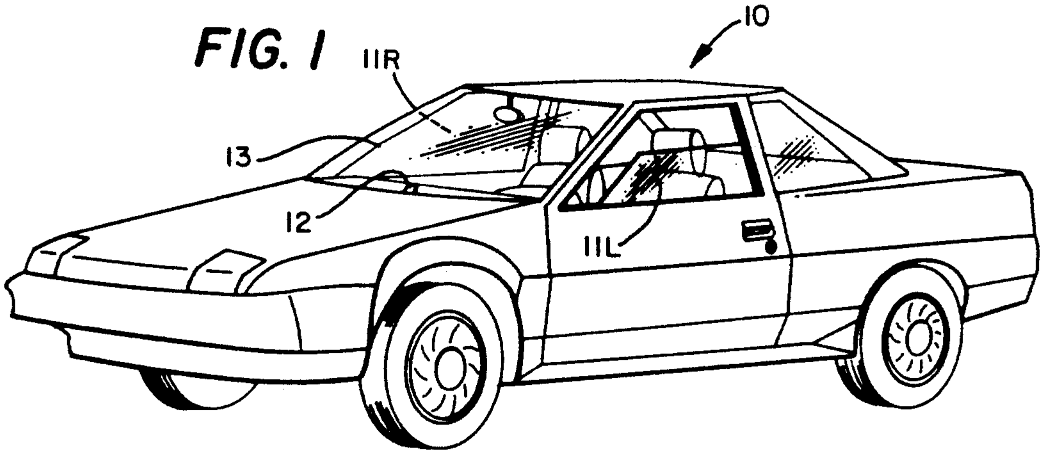

This invention relates in general to vehicle electric window opening and closing systems, and more particularly, to a rain sensor car electric window closure control.

Many times one leaves electric powered windows of a vehicle down when they go indoors so it would be especially useful if they were to automatically close when it begins to rain. If the windows remain open there can be water damage to the car interior and to things left in the car. Many a car owner has had to run out in the rain to close car windows getting quite wet himself in the process.

It is therefore a principal object of this invention to insure closed window protection for vehicle electric windows when it begins to rain.

Another object is to eliminate worry that rain will damage the interior and contents of a car.

A further object is to not have to run out in the rain to close car windows.

Still another object is to be able to leave car windows open for cooling air circulation through a car while not worrying about the possibility of a rain storm occurring.

Features of the invention useful in accomplishing the above objects includes, in a rain moisture sensor car electric window closure control, the provision, with an automobile having electric power windows a power drive control circuit including a solid state on-off power solid state device such as a PNP transistor with a moisture content sensor element interconnecting two electrodes of the solid state device (the emitter and base of the PNP transistor). When the moisture content sensor element becomes moistened as by rain falling thereon its electric through path resistance lessens to thereby achieve bias to conductive state for the PNP transistor through conductive state to activate the window motor drive and close any vehicle windows from the open state.

Specific embodiments representing what are presently regarded as the best modes of carrying out the invention are illustrated in the accompanying drawings.

Figure 2:
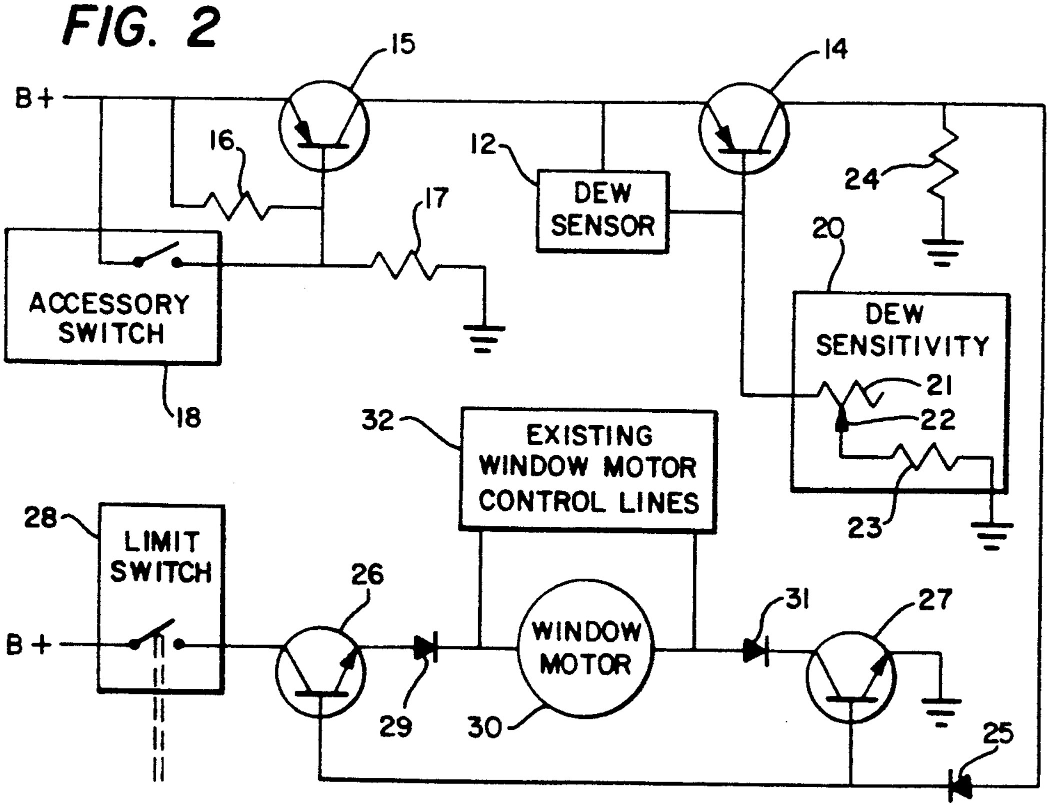
Figure 3:
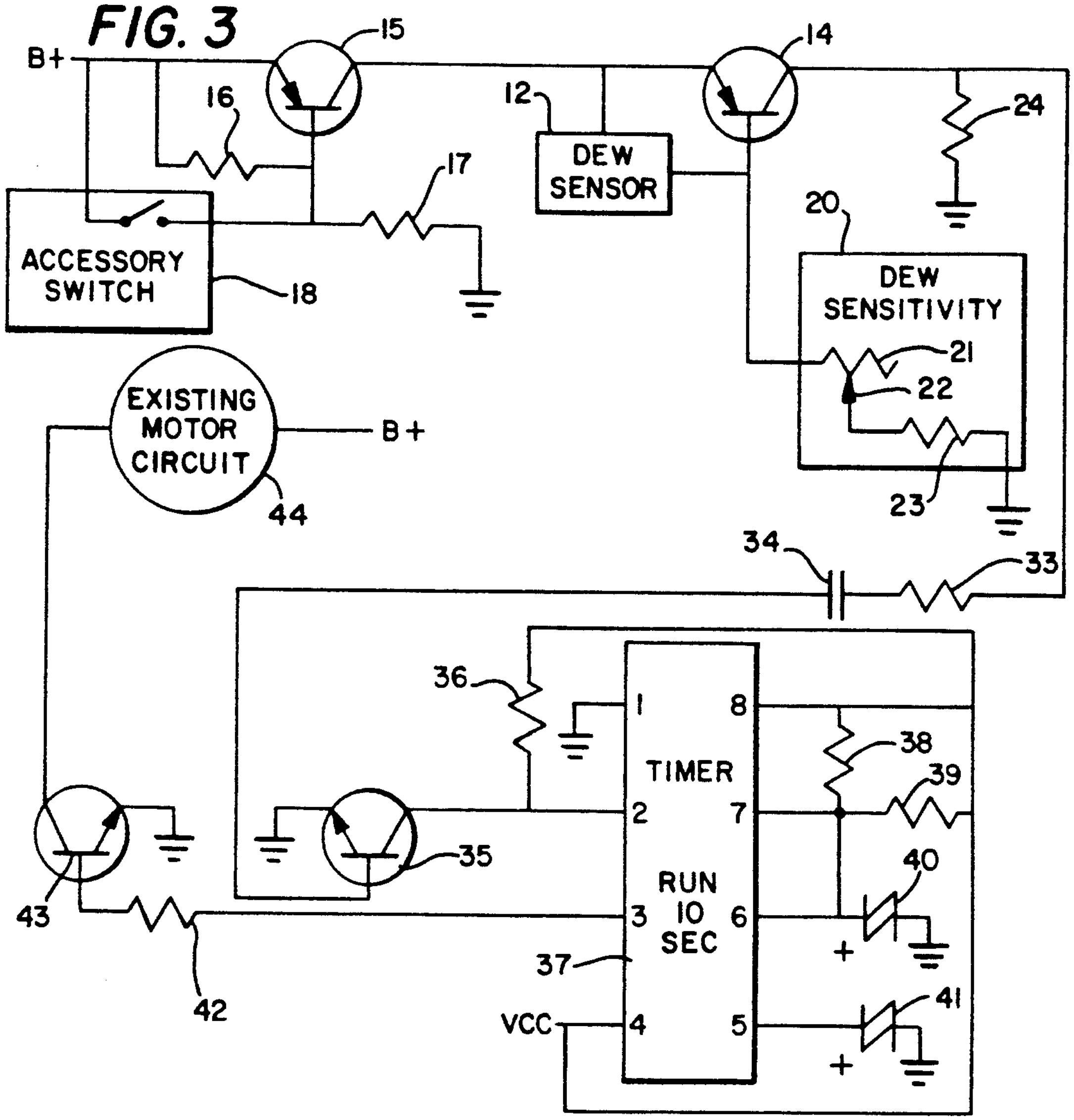
Figure 4:
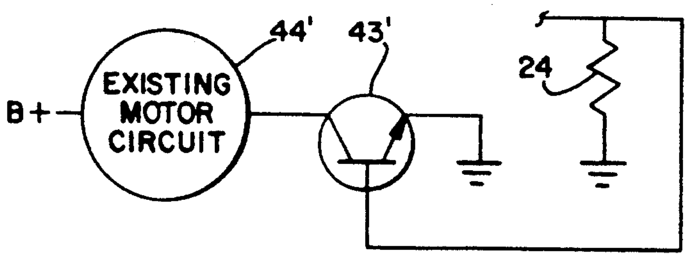

In the drawings:

FIG. 1 represents a perspective view of an automobile with electric powered windows equipped with a rain sensor car electric window closure control system;

FIG. 2, a block schematic circuit diagram of a rain sensor car electric window closure control system;

FIG. 3, a block schematic circuit diagram of another rain sensor car electric window closure control system; and, FIG. 4, a partial block schematic of a third embodiment rain sensor car electric window closure control system.

Referring to the drawings:

The two door automobile 10 of FIG. 1 is equipped with two electric power windows 11L and 11R and has a rain sensor element mounted at the outside bottom middle of the windshield 13. Referring also to FIG. 2 the rain sensor element 12 which may be a moisture content sensor pad, is connected between the emitter and base of PNP transistor 14. As element 12 becomes moistened, as by rain drops falling thereon, the resistance thereof lessens such that as a voltage divider with adjustable value dew (moisture) sensitivity resistor 21 on through tap 22 and resistor 23 to ground establishes a trigger bias-emitter to base of PNP transistor 14 when B+ voltage is being applied to the emitter. Accessory switch 18 is connected between the B+ voltage supply connection to the emitter of PNP transistor 15 and the base of the transistor. A voltage divider from B+ through resistors 16 and 17 to ground has the resistor junction connected to base of transistor 15. If the accessory switch 18 is opened the voltage bias developed between the emitter and base of transistor 15 biases the transistor to a state of conduction passing B+ voltage therethrough to the emitter of PNP transistor 14 and to the moisture sensor 12.

The collector of PNP transistor 14 is connected through resistor 24 to ground and to the anode of diode 25. The cathode of diode 25 is connected to the base of each of NPN transistors 26 and 27. B+ voltage is connectable through normally closed limit switch 28 that is opened by the vehicle window 11L and 11R being closed as it comes to the closed state. This stops B+ voltage power flow through limit switch 28 to the collector of NPN transistor 26 having an emitter connection to the anode of diode 29. The cathode of diode 29 is connected to window motor 30 the other circuit side of which is connected to the anode of diode 31. The cathode of diode 31 is connected to the collector of NPN transistor 27 that has an emitter connection to ground. The two power lines from an existing window motor control power source 32 are connected one to the junction of diode 29 and window motor 30 and the other power line is connected to the junction of window motor and diode 31. When power source 32 is used for window motor 30 diode 29 prevents any electric power back flow to the emitter of transistor 26.

With reference to the embodiment of FIG. 3 the first portion of the circuit through the PNP transistor 14 collector connection through resistor 24 to ground is the same as with the circuit of FIG. 2 but here the collector of transistor 14 is connected to resistor 33. Resistor 33 is connected through capacitor 34 to the base of NPN transistor 35 that has an emitter connection to ground and a collector connection through resistor 36 to a voltage VCC reference supply and also to terminal 2 of a LE555 IC integrated timer circuit 37 that is settable to rain, for example, for ten seconds. Voltage VCC reference supply is applied directly to terminal 8 of IC 37 and terminals 7 and 6 of IC 37 through resistors 38 and 39 in parallel and also directly to terminal 4 of the timer IC 37. Terminals 7 and 6 of IC 37 are also connected to the positive side of polarized capacitor 40 having its other side connected to ground. Terminal 5 of the timer IC 37 is connected to the positive side of polarized capacitors 41 having it's other side connected to ground. Terminal 1 of the IC timer 37 is connected to ground, and terminal 3 is output connected through resistor 42 to the base of NPN transistor 43 having an emitter connected to ground. The collector of NPN transistor 43 is connected through the existing vehicle window motor circuit 44 to B+ voltage. With this embodiment the window driving motor 44 may run for the run time of the timer IC 37 (typically ten seconds) or will cut off by the window top engaging a limit switch (such as limit switch 28 in FIG. 2).

With the embodiment of FIG. 4 the collector of PNP transistor 14 (as in FIGS. 2 and 3) is connected to the base of NPN transistor 43' having an emitter connection to ground and a collector connection through the existing motor window drive circuit 44' to the B+ voltage supply.

These various circuit embodiments, in addition to driving electric drive motors, can also be used as the drive motor system closing an open overhead sun window of a vehicle.

Whereas this invention has been described with respect to several embodiments thereof, it should be realized that various changes may be made without departure from the essential contributions to the art made by the teachings hereof.

I claim:

1. A vehicle electric window rain sensor closure control comprising: a solid state on-off electric power device having at least three electrodes; a moisture content sensor element interconnecting first and second electrodes of the solid state on-off electric power device positionable on a vehicle to indicate moisture content consistent with rainfall and correspondingly increase electrical conductivity; electric power source means connected to said first electrode of said solid state on-off electric power device and to said moisture content sensor element; first resistive means connected to said moisture content sensor element and to said second electrode of said solid state on-off electric power device, and to an electric potential reference source forming a voltage divider with the junction of said moisture content sensor element and said resistive means connected to said second electrode; an electric window driven by a window drive motor; an electric power circuit connected to said electric power source means and extended through said window drive motor to circuit connection with said electric potential reference source; and on-off solid state switch means in said electric power circuit, circuit means connected to a third electrode of said solid state on-off electric power device; wherein said third electrode has a connection through second resistive means to said electric potential reference source; wherein an on-off solid state device circuit is a power on-off control in the power supply circuit from a vehicle battery connected as said electric power source means to said vehicle electric window rain sensor closure control; said on-off electric power device is a PNP transistor; said on-off solid state device in the power supply circuit is a PNP transistor; and wherein a resistor and an accessory switch are connected in parallel between the emitter and base of said on-off solid state device PNP transistor, and a resistor is connected between the transistor and ground.

2. The vehicle electric window rain sensor closure control of claim 1, wherein said circuit means connected to said third electrode of said PNP transistor includes a timer circuit.

3. A vehicle electric window rain sensor closure control comprising: a solid state on-off electric power device having at least three electrodes; a moisture content sensor element interconnecting first and second electrodes of the solid state on-off electric power device positionable on a vehicle to indicate moisture content consistent with rainfall and correspondingly increase electrical conductivity; electric power source means connected to said first electrode of said solid state on-off electric power device and to said moisture content sensor element; first resistive means connected to said moisture content sensor element and to said second electrode of said solid state on-off electric power device, and to an electric potential reference source forming a voltage divider with the junction of said moisture content sensor element and said resistive means connected to said second electrode; an electric window driven by a window drive motor; an electric power circuit connected to said electric power source means and extended through said electric power window motor to circuit connection with said electric potential reference source; and on-off solid state switch means in said electric power circuit, circuit means connected to a third electrode of said solid state on-off electric power device; wherein said third electrode has a connection through second resistive means to said electric potential reference source; wherein an on-off solid state device circuit is a power on-off control in the power supply circuit from a vehicle battery connected as said electric power source means to said vehicle electric window rain sensor closure control; said on-off electric power device is a PNP transistor; and said first, second, and third electrodes of said on-off electric power device are the emitter, base, and collector of said PNP transistor, respectively wherein said moisture content sensor element is connected between the emitter and base of said PNP transistor; said first resistor means is an adjustable value resistor connected between the base of said PNP transistor and ground; and the collector of said PNP transistor is connected to said circuit means; and wherein said circuit means includes a diode connected to the bases of two like transistors, said two like transistors each having a connection through a diode to opposite side terminals of a window drive motor; window travel limit switch means in a power circuit connection from the vehicle battery to one of said two like transistors with the other of said two like transistors having an electrode connection to ground; and two diodes with common current direction orientation one between each of said two like transistors and respective adjacent sides of said electric power window motor.

4. The vehicle electric window rain sensor closure control of claim 3, wherein existing standard window motor control lines extended from a control source are connected to opposite sides of said electric power window motor.

* * * * *